US007314635B2

(12) United States Patent
Dooley

(10) Patent No.: US 7,314,635 B2
(45) Date of Patent: Jan. 1, 2008

(54) BRIQUETTES

(75) Inventor: Martin Dooley, West Lancashire (GB)

(73) Assignee: Sorex Limited, Widnes, Cheshire (GB)

( * ) Notice: Subject to any disclaimer, the term of this patent is extended or adjusted under 35 U.S.C. 154(b) by 744 days.

(21) Appl. No.: 10/450,354

(22) PCT Filed: Dec. 13, 2001

(86) PCT No.: PCT/GB01/05509

§ 371 (c)(1), (2), (4) Date: Oct. 31, 2003

(87) PCT Pub. No.: WO02/47896

PCT Pub. Date: Jun. 20, 2002

(65) Prior Publication Data

US 2004/0060455 A1 Apr. 1, 2004

(30) Foreign Application Priority Data

Dec. 13, 2000 (GB) ................................ 0030340.4

(51) Int. Cl.
*A01N 25/34* (2006.01)

(52) U.S. Cl. ...................... 424/410; 424/405; 424/406; 424/408; 424/409; 424/84; 43/131

(58) Field of Classification Search ......... 424/405–421
See application file for complete search history.

(56) References Cited

U.S. PATENT DOCUMENTS

| | | | | |
|---|---|---|---|---|
| 2,595,865 | A | 5/1952 | Lunsford | |
| 3,113,076 | A | 12/1963 | Jacobs | |
| 3,840,631 | A | 10/1974 | Alexander | |
| 4,057,381 | A | 11/1977 | Korsch | |
| 4,798,529 | A | 1/1989 | Klinner | |
| 4,816,262 | A | 3/1989 | McMullen | |
| 4,891,218 | A * | 1/1990 | Sherman | 424/84 |
| 5,449,514 | A * | 9/1995 | Marshall et al. | 424/84 |
| 6,009,690 | A | 1/2000 | Breitenbach | |

* cited by examiner

*Primary Examiner*—Neil S. Levy
(74) *Attorney, Agent, or Firm*—Pearne & Gordon LLP

(57) ABSTRACT

A briquette, which is easily pierceable and supportable, comprises compacted particulate material and has an outer region (1) and an inner region (2), said inner region (2) being provided with a well (3) having a diameter which decreases progressively in a non-linear relationship with increasing distance from the top of the well such that the sides of the well extend convexly into the well. The briquette, preferably, is a rodenticide block although it may, instead, be a block for sanitary, and/or domestic use. The briquette may be manufactured by compacting particulate material into the nip between a first rotating roll, having a surface provided with a suitable mould, and a second, counter-rotating roll.

13 Claims, 2 Drawing Sheets

BRIQUETTES

This application claims the benefit of International Application Number PCT/GB01/05509, which was published in English on Jun. 20, 2002.

The present invention relates to briquettes and to a method of making them. More particularly, it relates to a briquette which is formed to have a readily accessible hole by which it can be suspended on, or fixed to, a support.

The invention is of particular use in the manufacture of pesticide blocks, especially rodenticide blocks, but is also believed to have use in the manufacture of blocks for domestic and/or sanitary applications such as lavatory cleaning or freshening blocks and air freshening blocks.

In the United Kingdom there are requirements for regulatory purposes to be able to secure rodenticide-containing bait blocks. This is normally achieved by introducing a hole in the block. A nail or pin can then be used to secure the block in the location required to ensure that that block is not removed from this location. Such blocks are commercially available but they are manufactured by either an extrusion process or a casting process. It would also be possible to produce blocks with holes using press equipment similar to a tablet press. Although an extrusion process can be operated as a continuous process, the material to be extruded needs to have sufficient fluidity otherwise blocking of the extrusion die can occur. Also, a product having a hole, obtained by an extrusion process, will have a hole of uniform dimensions which is as deep as the thickness of the extruded product. Unless the extruded product is cut, after extrusion, into thin slices it is necessary to use long nails or pins to secure the extruded product through the hole provided.

One aim of the present invention is to provide a briquette comprising compacted particulate material which has a pierceable section of non-uniform dimensions which can be readily pierced by a nail or rod of relatively short length to achieve a secure fastening.

Accordingly, the present invention provides a briquette, comprising compacted particulate material, having an outer region and an inner region, said inner region being provided with a well having a diameter which decreases progressively in a non-linear relationship with increasing distance from the top of the well such that the sides of the well extend convexly into the well.

The briquettes of the present invention are formed not with a hole of uniform dimension but with a well which has sides which extend convexly into the well. Preferably, the well does not have sides which in cross-section describe the arc of a circle since in such a case the rate of decrease of the diameter of the well with increasing depth of the well (i.e. distance from the top to the bottom of the well) becomes so small that the well bottom, when pierced for suspension on a support, may not be readily accessible to the support. According to a preferred embodiment, the diameter at the bottom of the well is less than the depth of the well.

The purpose of the well is to allow secure fastening of the briquette onto a suitable support. The provision of a well which has a diameter larger than is necessary to achieve this results in a briquette which has a well volume which is excessively large to the detriment of the volume comprising the compacted particulate material. In a particularly preferred embodiment, the well has a shape which is defined by an inverse hyperbolic truncated cone. The well extends into the thickness of the briquette such that at the well bottom the disc of compacted material is sufficiently thin to enable it to be pierced easily. Preferably, a briquette according to the present invention is provided with two wells approaching each other from opposite sides of the briquette, i.e. the wells are aligned with each other. The edge of the briquette at its outer region is discontinuous at the junction of the top side of the briquette with the bottom side of the briquette and, typically, is pointed. In the case of a rodenticide block such a pointed edge provides a location on the block at which a rodent can readily bite. Thus, according to a preferred embodiment the inner region on a first side of the briquette is provided with a first well and the inner region on a second side of the briquette opposite to the first side is provided with a second well opposite to the first well. According to this preferred embodiment, the second well will also have a diameter which decreases progressively in a non-linear relationship with increasing distance from the top of the second well. Thus, the sides of the second well extend convexly into the second well and the dimensions of the first and second wells are similar and, preferably, identical.

According to a further aspect, the present invention provides a method of making a briquette, comprising compacted particulate material, having an outer region and an inner region, said inner region being provided with a well having a diameter which decreases progressively in a non-linear relationship with increasing distance from the top of the well such that the sides of the well extend convexly into the well which method comprises feeding a particulate material to be compacted into the nip between a first roll and a second, counter-rotating, roll, said first roll having a surface in which is provided at least one depression mould having a mould interior, a mould exterior at the circumference of the roll and a post extending radially from the lowest portion of the mould interior to an extremity within the circumference of the roll which post has a diameter which decreases progressively in a non-linear relationship with increasing distance from the lowest portion of the mould such that the sides of the post extend concavely away from the lowest portion of the mould, compacting the particulate material in the mould as the first and second rolls rotate through the nip and collecting the compacted briquette as it leaves the mould as the first and second rolls rotate away from the nip. In order to produce a briquette having two wells approaching each other from opposite sides of the briquette it is necessary for the second roll to have a surface in which is provided at least one depression mould having a mould interior, a mould exterior at the circumference of the roll and a post extending radially from the lowest portion of the mould interior to an extremity within the circumference of the second roll. The post has a diameter which decreases progressively in a non-linear relationship with increasing distance from the lowest portion of the mould interior such that the sides of the post extend concavely away from the lowest portion of the mould interior. It is necessary, of course, that the first and second rolls are aligned such that the mould provided in the surface of the first roll is opposed to the mould provided in the surface of the second roll with the post extending from the mould provided in the first roll being completely aligned with the post extending from the mould provided in the counter-rotating second roll. Typically, both the first and second rolls will each be provided with a plurality of moulds wherein the moulds and posts provided on the two rolls are exact opposites of each other and are aligned when turning in opposite directions of rotation.

The invention will now be described, by way of example only, with reference to the accompanying drawings in which.

Figure 1:
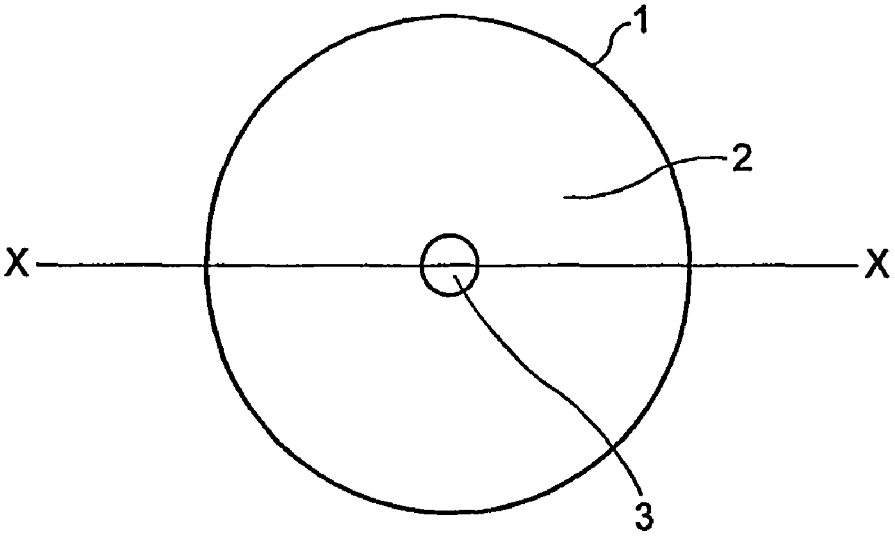
FIG. 1 shows a plan view of a briquette according to a preferred embodiment of the present invention.
Figure 2:
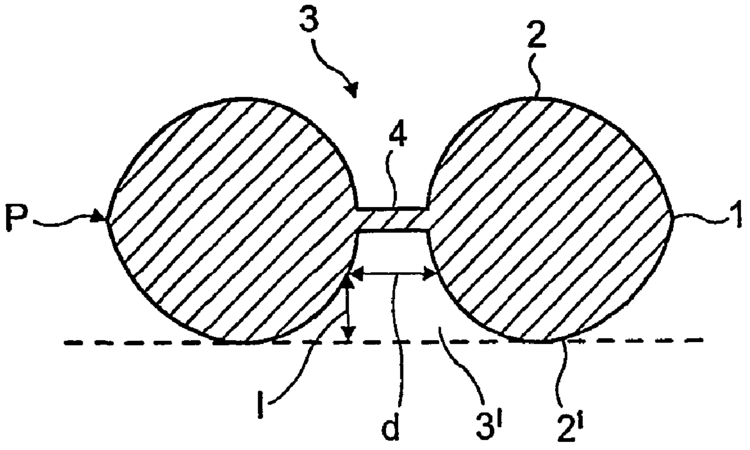
FIG. 2 shows a cross-section of the briquette shown in FIG. 1 along the line X-X.

Referring to FIG. 1, a briquette comprising compacted particulate material according to the present invention has an outer region 1 and an inner region 2. A well 3 is provided in the inner region. As shown in FIG. 2, the briquette is provided with a second well 3' in the inner region 2' opposite to the well 3. The wells 3, 3' each have diameters d which decrease progressively in a non-linear relationship with increasing distance I from the top of the well. Thus, the gradient of the sides of each well increases progressively from the top of the well to the bottom of the well such that the sides of each well extend convexly into the well. The two wells 3, 3', at their bottom-most points are separated by a thin disc 4 of the compacted particulate material. The diameter of the well bottom is substantially smaller than the distance of the well bottom from the top of the well. The disc 4 can be pierced by a nail to secure the briquette to a support. The top surface and the bottom surface of the briquette, at the outer region, meet at point p which provides a biting edge for a rodent.

Figure 3:
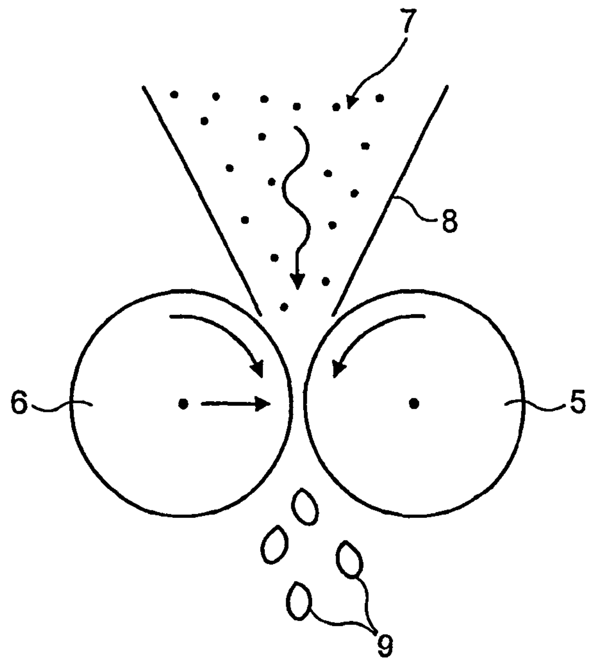
FIG. 3 shows diagrammatically a briquette apparatus used to produce the briquette shown in FIG. 1.
Figure 4:
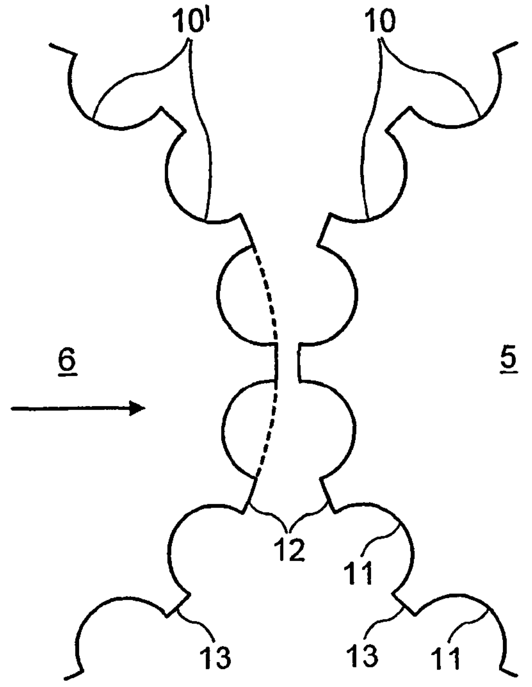
FIG. 4 shows a partial cross-section of the rolls of briquetting apparatus of FIG. 3.

With reference to FIG. 3, the apparatus comprises a roll 5 having a fixed axis of rotation and a roll 6, which rotates in the direction opposite to the direction of rotation of roll 5. Roll 6 is spaced apart from roll 5 but is biased towards roll 5. Particulate material 7 is screwed down cone feeder 8 and forced between the rolls 5 and 6. Formed briquettes 9 leave the apparatus as the rolls rotate. As shown in FIG. 4, the surfaces of each of rolls 5 and 6 are provided with half moulds 10, 10' into which the particulate material is compacted. As will be appreciated a half mould 10 formed into the surface of roll 5 is completely aligned with a co-operating half mould 10' formed into the surface of roll 6 such that the half moulds 10, 10' are located exactly opposite each other as the particulate material is fed into the nip between the rolls. The counter-rotation of the rolls 5 and 6 causes the particulate material to be compressed into both half moulds and the biasing of roll 6 towards roll 5 causes the two half moulds to be brought together such that the particulate material compressed into the half mould 10' in the surface of roll 6 becomes compressed with the particulate material compressed into the half mould 10 in the surface of roll 5. Thus, at their closest location, the half moulds together form a complete mould for the briquette.

As can be seen in FIG. 4 each half mould provided into the surface of roll 5 or into the surface of roll 6 comprises a mould interior 11, a mould exterior 12 (at the circumference of the roll) and a post 13 which extends radially from the lowest portion of the mould interior 11. The post 13 does not extend to the circumference of the roll but has an extremity which is within this circumference, i.e., the distance from the axis of rotation of the roll to the end of the post is less than the radius of the roll. By this means, as the rolls 5 and 6 counter-rotate the mould exteriors 12 on the surfaces of the rolls act together to close the mould whereas the posts 13 act together to compress the particulate material into a disc (shown as disc 4 in FIG. 2). The formed briquettes fall from or are ejected from the mould as the rolls rotate downwards and the half moulds in rolls 5 and 6 separate. To ease the removal of the briquette from the mould, the mould interior is preferably machined to provide a release surface. Alternatively, the mould interior may be provided with a release coating.

Although in the embodiment described above the moulds are designed to provide a briquette having wells which have a shape defined by an inverse hyperbolic truncated cone and a shape that is approximately toroidal it will be appreciated that other shapes can be achieved by the use of appropriately shaped moulds.

EXAMPLE

Rodenticide briquettes were made, according to the method described above, using the following formulation (wherein the percentages are by weight)

| | |
|---|---|
| Difenacoum | 0.005% |
| Wax Powder | 25.2% |
| Cereals | 74.5% |
| Inerts | Balance |

The briquette, thus produced, possessed integrity and did not crumble or break easily. The briquette had a thin disc of compressed material at its centre which was easily pierced by a nail to enable securement to a support.

Although the example describes the production of a rodenticide block it will be appreciated that different formulations can be manufactured into blocks, having different applications, according to the present invention. For instance, it will be appreciated that the present invention can be applied to the manufacture of blocks for sanitary and/or domestic use such as toilet freshening blocks, cistern blocks and air freshening blocks.

What is claimed is:

1. A briquette, comprising compacted particulate material which contains a rodenticide, having an outer region and an inner region, said inner region being provided with a well having a diameter which decreases progressively in a non-linear relationship with increasing distance from the top of the well such that the sides of the well extend convexly into the well, wherein the well has a shape which is defined by an inverse hyperbolic truncated cone.

2. A briquette according to claim 1, wherein the inner region on a first side of the briquette is provided with a first well and wherein the inner region on a second side of the briquette opposite to the first side is provided with a second well opposite to the first well, said second well having a diameter which decreases progressively in a non-linear relationship with increasing distance from the top of the second well such that the sides of the second well extend convexly into the second well, wherein the second well has a shape which is defined by an inverse hyperbolic truncated cone.

3. A briquette according to claim 1, wherein the inner region on a first side of the briquette is provided with a first well and wherein the inner region on a second side of the briquette opposite to the first side is provided with a second well opposite to the first well, said second well having a diameter which decreases progressively in a non-linear relationship with increasing distance from the top of the second well such that the sides of the second well extend convexly into the second well.

4. A briquette according to claim 3, wherein the first well has a bottom and the second well has a bottom such that the bottom of the first well is separated from the bottom of the second well by a disc of the compacted particulate material which is formed integrally with the briquette.

5. A briquette according to claim 3, wherein the first well at its bottom is in open communication with the second well.

6. A briquette according to claim 1, wherein the compacted particulate material comprises a pesticidal composition.

7. A briquette according to claim 2, wherein the first well has a bottom and the second well has a bottom such that the bottom of the first well is separated from the bottom of the second well by a disc of the compacted particulate material which is formed integrally with the briquette.

8. A briquette according to claim 2, wherein the first well at its bottom is in open communication with the second well.

9. A method of making a briquette, said method comprising feeding a particulate material to be compacted into the nip between a first roll and a second, counter-rotating roll, said first roll having a surface in which is provided at least one depression mould, having a mould interior, a mould exterior at the circumference of the roll and a post extending radially from the lowest portion of the mould interior to an extremity within the circumference of the roll which post has a diameter which decreases progressively in a non-linear relationship with increasing distance from the lowest portion of the mould such that the sides of the post extend concavely away from the lowest portion of the mould, compacting the particulate material in the mould as the first and second rolls rotate through the nip and collecting the compacted briquette as it leaves the mould as the first and second rolls rotate away from the nip, said method resulting in the production of a briquette according to claim 1.

10. A method according to claim 9, wherein the second roll has a surface in which is provided at least one depression mould having a mould interior, a mould exterior at the circumference of the roll and having a post extending radially from the lowest portion of the mould interior to an extremity within the circumference of the second roll which post has a diameter which decreases progressively in a non-linear relationship with increasing distance from the lowest portion of the mould interior such that the sides of the post extend concavely away from the lowest portion of the mould interior, the said mould in the surface of the second roll being aligned with the mould in the surface of the first roll and the said post extending from the mould in the second roll being aligned with the post extending from the mould in the first roll such that the two moulds and the two posts co-operate as the first and second rolls counter-rotate.

11. A briquette according to claim 4, wherein the compacted particulate material comprises a pesticidal composition.

12. A briquette according to claim 5, wherein the compacted particulate material comprises a pesticidal composition.

13. A briquette according to claim 3, wherein the compacted particulate material comprises a pesticidal composition.

* * * * *